Nov. 21, 1950  M. M. SPRUNG  2,531,169
METHOD OF MAKING INSULATED ELECTRICAL CONDUCTORS
Filed Aug. 27, 1946
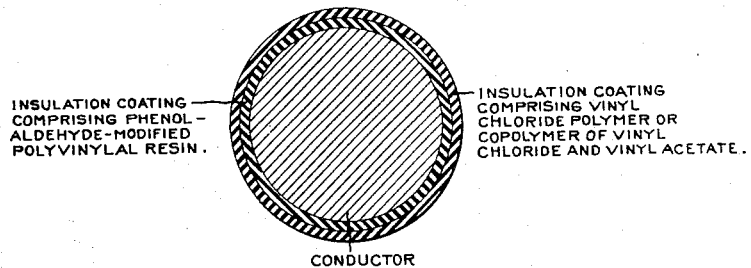
Inventor:
Murray M. Sprung,
by His Attorney.

Patented Nov. 21, 1950

2,531,169

UNITED STATES PATENT OFFICE 2,531,169

METHOD OF MAKING INSULATED ELECTRICAL CONDUCTORS

Murray M. Sprung, Scotia, N. Y., assignor to General Electric Company, a corporation of New York Application August 27, 1946, Serial No. 693,218

4 Claims. (Cl. 117—75)

This invention relates to insulated electrical conductors and is concerned with the manufacture of such conductors having electrically insulating coatings of organic enamel of the phenol-aldehyde-modified polyvinylal resin type. More specifically the present invention relates to such insulated electrical conductors provided with a superimposed coating comprising a high molecular weight polymer or copolymer of vinyl chloride over a base coating of phenol-aldehyde-modified polyvinylal resin.

Electrical conductors insulated with organic enamels of the heat-hardenable, phenol-aldehyde-modified polyvinylal resin type are disclosed and claimed in Jackson and Hall Patent No. 2,307,588, which is assigned to the same assignee as the present invention. In general, such insulated conductors have been proven to be superior to those previously known from the standpoint that the insulating film on such conductors exhibit markedly improved water resistance, resistance to alcohols, hydrocarbons, particularly toluol, xylol, etc., and chlorinated solvents, dielectric strength, flexibility, and resistance to heat shock. In addition, the insulating film appears to have less thermoplastic flow and is more readily applied than earlier known enamels.

It has now been found that such insulated conductors may be still further improved, especially as to the water-resistance of the coating, when the modified polyvinylal resin layer is provided with a superimposed coating of a high molecular weight polymer or copolymer of vinyl chloride. In many applications such as, for example, in coils for apparatus which is exposed over extended periods to moisture or salt spray, in line wire, and low tension power conduits which are continuously or intermittently exposed to adverse atmospheric conditions, the insulated conductors of the present invention are superior to the prior art types.

Modified polyvinylal resins when applied as an enamel coating on a conductor are somewhat pervious to moisture. The diffusion constant for penetration of moisture through phenol-aldehyde-modified polyvinylal resin films is of the order of 2.0 gram centimeters per centimeter$^2$ per hour per millimeter of mercury pressure gradient; whereas that of the most highly moisture resistant organic materials may be as low as 0.1 expressed in the same units. In addition, under certain conditions, the modified polyvinylal films undergo a phenomenon commonly designated as "crazing" when brought into contact with moisture or with a variety of polar organic liquids while under mechanical stress. This phenomenon of crazing is manifested physically by the appearance of microscopic or even visible annular striations when a stressed resin film is subjected to moisture or to polar organic liquids; and is evidenced by a marked decrease in the electrical resistance of the film. When phenol-aldehyde-modified polyvinylal resin enamelled wire is stressed, even moderately, the dielectric strength, determined in the presence of moisture, may be impaired as compared with the dry dielectric strength of the same insulation coating.

In accordance with my invention, I am able to manufacture insulated conductors having all the advantages of conductors insulated with phenol-aldehyde-modified polyvinylal resins without the normal inherent disadvantages which have been discussed in the foregoing. These disadvantages are overcome by applying a thin layer of a resinous composition comprising a high molecular weight polymer of vinyl chloride or a copolymer of vinyl chloride and vinyl acetate over the phenol-aldehyde-modified polyvinylal enamel layer, as will be described more fully hereinafter. The resulting composite insulation is remarkably more resistant to crazing and has a higher insulation resistance under moist conditions than the modified polyvinylal resin enamel alone.

The novel features of my invention are set forth in the appended claims. The invention itself, however, will be understood most readily from the following description when considered in connection with the accompanying drawing in which is shown a cross-sectional view of an electrical conductor provided with insulation in accordance with my invention.

The vinyl chloride-vinyl acetate copolymers which I preferably employ in overcoatings for the modified polyvinylal enamels are those prepared by polymerization of mixtures containing approximately 85 to 95 percent vinyl chloride and approximately 5 to 15 percent vinyl acetate. The higher molecular weight polymers and copolymers are preferred to those of lower molecular weight because of their greater physical and chemical stability and good dielectric and electrical resistance under conditions of high humidity.

In order to apply these high molecular weight polymers and copolymers to the wire it is desirable to have them in such form as to facilitate their use in ordinary dipping or die-coating operations. It is well known that the higher molecular weight vinyl chloride polymer and vinyl chloride-vinyl acetate copolymer resins are very difficult to dissolve and tend to form extremely viscous solutions at relatively low resin contents. This high viscosity makes difficult the incorporation of pigments and fillers and, in addition, complicates handling in industrial baking ovens. Heretofore these difficulties have been avoided by employing large percentages of plasticizers with the vinyl resins and carrying out the application to wire by extrusion methods. However, extrusion methods have been found to be entirely unsuited for applying thin overcoatings, for example coatings of only 1 to 3 mils thickness, because of the tendency to damage the undercoating and because of the non-uniformities in the resulting insulation layer.

I have found that the above difficulties involved in the application of electrically insulating overcoatings comprising the above mentioned vinyl chloride polymer and copolymer resins can be overcome by employing a dispersion of the resins rather than a solution. In general these dispersions contain an active solvent or swelling liquid for the resin, and one or more non-solvents or dispersing liquids to limit the degree of solvation or wetting of the particles of resin by the solvent, and to cause dispersion of the partially or incipiently swelled particles. By employing the proper solvents and dispersing liquids, both coagulation of the resin into an intractable, viscous mass, and the equally undesirable phenomenon of granulation of the resin particles are avoided.

The term "swelling liquids" as used herein includes materials which are solvents for the vinyl chloride polymers and copolymers, for example, ketones such as methyl ethyl ketone, cyclohexanone, ethyl cyclohexanone, and isophorone; and other materials which are capable of wetting and swelling the vinyl resins, including esters of phthalic and phosphoric acids, such, as for example, diethyl phthalate, dibutyl phthalate, diamyl phthalate, dioctyl phthalate, triethyl phosphate, tributyl phosphate, tricresyl phosphate, etc. Other suitable swelling liquids are ether alcohols such as, for example, ethylene glycol monoethyl ether, ethylene glycol monobutyl ether, diethylene glycol monoethyl ether, and diethylene glycol monobutyl ether.

The term "dispersing liquids" includes materials which are not solvents for the vinyl resins. As dispersing liquids, I have found that, in general, straight chain and cyclic aliphatic, and aromatic hydrocarbons having boiling points of from about 100° C. to about 225° C. are suitable. Mixtures of the above-mentioned hydrocarbons may likewise be employed. For example, particularly good results are obtained when a dispersing liquid containing a mixture of aromatic and aliphatic hydrocarbons is employed. Various aliphatic hydrocarbons may be employed such as, for example, petroleum spirits, paraffin hydrocarbon, decahydronaphthalene, methyl cyclohexane, ethyl cyclohexane, and a number of other commercially available mixtures of aliphatic hydrocarbons such as, for example, varnish makers' and painters' naphtha, and high naphthene content aliphatic solvents, more particularly those containing between 25 and 75 percent naphthenic hydrocarbons. Examples of suitable aromatic hydrocarbons are compounds, such as, for example, toluene, xylene, cumene, methyl naphthalene, dimethyl naphthalene, diamyl naphthalene, and mixtures of aromatic compounds, for example, those known commercially as solvent naphtha, hi-flash naphtha, and high aromatic content petroleum hydrocarbon mixtures (e. g., 60–97 percent aromatic high solvency naphtha).

The aliphatic hydrocarbons are more effective than the aromatic hydrocarbons in limiting excessive swelling of the particles of resin by the swelling liquid, but in view of the fact that a certain amount of swelling of the resin particles in the dispersion is necessary, it is possible more accurately to control the ultimate properties of the dispersion by employing both aromatic and aliphatic hydrocarbons in the dispersion liquid. If desired, certain aromatic hydrocarbons alone may be used as the dispersion liquid.

As heretofore pointed out, the vinyl resin overcoatings applied over phenol-aldehyde-modified polyvinylal resin insulating coatings, employing the dispersion-coating method of my invention, greatly improve the dielectric properties of the insulation particularly under extremely moist conditions. However, I have found that in order to obtain an insulating coating having improved properties from the standpoint of resistance to the various outdoor weather conditions, e. g., sun, rain, snow, chimney gases, etc., it is desirable to incorporate a pigment or mixture of pigments in the vinyl resin dispersion. The amount of pigment employed may be varied depending on the hardness, flexibility and electrical properties desired. However, in general, pigment in amounts of from approximately 30 percent to about 60 percent of the weight of vinyl resin employed has been found satisfactory for most applications. Examples of pigments which I have found suitable are basic blue lead sulfate, basic lead silicate, lead titanate, calcium carbonate, titanium dioxide, and carbon black. In addition to improving the weathering properties of the insulation coating, the addition of pigment to the vinyl resin dispersions improves the mechanical properties, and particularly the abrasion resistance of the final coating obtained from the dispersions. Furthermore, colored pigments may be added for purposes of identification.

Various ratios of the above-described ingredients may be employed in preparing the vinyl resin dispersions depending on the properties desired in the final insulation coating. In general, however, it has been found that the ratio, by weight, of liquid ingredients to solid ingredients, should be from about 2½ to 1 to about 3½ to 1. The liquid ingredients include the swelling liquids and the dispersing liquids. The ratio of swelling liquids to dispersing liquids may be varied depending on the capacity of the swelling liquid to wet and dissolve the resin particles and also on the capacity of the dispersing liquid to prevent wetting and solvation of the resin particles by the swelling agent.

Various means may be employed in mixing the ingredients discussed in the foregoing, but I have found it expedient to prepare the vinyl resin dispersions by mixing the ingredients in a ball-mill. In order that those skilled in the art may better understand and practice the method of my invention the following examples are given to illustrate the preparation of the vinyl polymer and copolymer resin dispersions. All parts are by weight.

*Example 1*

| | Parts |
|---|---|
| Vinyl chloride-vinyl acetate copolymer | 100.0 |
| Basic white lead silicate | 18.0 |
| Titanium dioxide | 42.0 |
| Gas black | 1.5 |
| Alpha-methyl naphthalene | 125.0 |
| Diamyl naphthalene | 200.0 |
| Dioctyl phthalate | 125.0 |

The solid ingredients listed above, consisting of the vinyl copolymer, lead silicate, titanium dioxide, and gas black, were weighed into a porcelain ball-mill about half filled with pebbles, followed by the liquid ingredients which had previously been mixed. The ball-mill was then rotated on a two-roll mixer at about 60 R. P. M. for about 22 hours at room temperature. The resulting dispersion was removed from the mill as a smooth, heavy, gray liquid having a viscosity of 11 seconds when tested with a #5 Zahn cup.

Example 2

| | Parts |
|---|---|
| Polyvinyl chloride | 100.0 |
| Basic white lead silicate | 18.0 |
| Titanium dioxide | 42.0 |
| Gas black | 1.5 |
| High naphthene aliphatic solvent | 100.0 |
| Petroleum spirits | 100.0 |
| High aromatic content petroleum hydrocarbon | 100.0 |
| Dibutyl phthalate | 107.0 |

The above ingredients were mixed and ball-milled for approximately 22 hours as described in Example 1. The resulting dispersion was similar in appearance to that prepared in Example 1.

Example 3

| | Parts |
|---|---|
| Vinyl chloride-vinyl acetate copolymer | 100.0 |
| Dibutyl phthalate | 107.0 |
| High naphthene aliphatic solvent | 100.0 |
| Petroleum spirits | 100.0 |
| High aromatic content petroleum hydrocarbon | 100.0 |
| Basic lead silicate | 18.0 |
| Titanium dioxide | 42.0 |
| Gas black | 1.5 |

The above ingredients were mixed and ball-milled as described in Example 1 and resulted in a dispersion similar in appearance to the product of Example 1.

Example 4

| | Parts |
|---|---|
| Vinyl chloride-vinyl acetate copolymer | 100.0 |
| Diethyl phthalate | 40.0 |
| High naphthene aliphatic solvent | 300.0 |
| Xylene | 150.0 |

The ingredients listed above were ball-milled for about 24 hours. The resulting dispersion was a colorless, translucent liquid.

Example 5

| | Parts |
|---|---|
| Vinyl chloride-vinyl acetate copolymer | 100.0 |
| Dibutyl phthalate | 107.0 |
| High naphthene aliphatic solvent | 100.0 |
| Petroleum spirits | 100.0 |
| High aromatic content petroleum hydrocarbon | 100.0 |
| Basic blue lead sulfate | 18.0 |
| Calcium carbonate | 42.0 |

The above ingredients were mixed and ball-milled as described in Example 1. The resulting dispersion was similar in consistency to the dispersion produced in Example 1.

Example 6

| | Parts |
|---|---|
| Vinyl chloride-vinyl acetate copolymer | 100.0 |
| Dibutyl phthalate | 107.0 |
| High naphthene aliphatic solvent | 100.0 |
| Petroleum spirits | 100.0 |
| High aromatic content petroleum hydrocarbon | 100.0 |
| Basic blue lead sulfate | 42.0 |

The above ingredients were mixed and ball-milled for about 24 hours. A smooth liquid dispersion resulted.

Example 7

| | Parts |
|---|---|
| Vinyl chloride-vinyl acetate copolymer | 100.0 |
| Dibutyl phthalate | 107.0 |
| High naphthene aliphatic solvent | 100.0 |
| Petroleum spirits | 100.0 |
| High aromatic content petroleum hydrocarbon | 100.0 |
| Basic lead sulfate | 18.0 |
| Titanium dioxide | 42.0 |

The above ingredients were mixed as described in Example 1 and ball-milled for about 24 hours. A smooth liquid dispersion resulted.

Example 8

| | Parts |
|---|---|
| Vinyl chloride-vinyl acetate copolymer | 400.0 |
| Dibutyl phthalate | 427.0 |
| High naphthene aliphatic solvent | 400.0 |
| Petroleum spirits | 400.0 |
| Hi-flash naphtha | 267.0 |
| Methyl naphthalene | 133.0 |
| Basic white lead silicate | 72.0 |
| Titanium dioxide | 168.0 |
| Gas black | 6.0 |

The above ingredients were mixed and ball-milled for about 24 hours. The resulting product was removed from the ball-mill as a smooth, liquid dispersion.

Enameled wires having a first coating, or undercoating, of phenol-aldehyde-modified-polyvinylal resin and an overcoating of an insulating composition containing a vinyl chloride polymer or copolymer such as, for example, those described in the above examples, are produced by first drawing the clean wire, for example, clean copper wire, through a bath of the modified polyvinylal resin enamel and baking the resulting coating at a suitable temperature, for example, at an oven temperature of about 200° to 500° C., preferably in an oven so designed as to give a graduated temperature of 200 to 250° minimum and 350 to 400° maximum. The wire is annealed simultaneously with this baking operation. In order to obtain the desired thickness of modified polyvinylal resin enamel coating, it may be necessary to pass the wire through the enamel bath and subsequently through the baking oven a number of times. After this layer of enamel has been built up to the desired thickness, the coated wire is further passed through a bath containing a dispersion of vinyl polymer or copolymer composition such as, for example, one of those set forth in the above examples. The wire is then passed through a baking oven at a temperature of about 200° C. to 500° C., and more preferably 250° C. to 350° C. The same oven may be used as that used for baking the modified polyvinylal resin coating. Therefore the method of my invention may be employed at little or no added equipment costs. In order to obtain the desired thickness of coating it may again be necessary to pass the wire through the dispersion bath and subsequently through the baking oven a number of times. A convenient method of carrying out the above described duplex coating process is to locate the bath containing the vinyl polymer or copolymer dispersion close to the bath of modified polyvinylal resin enamel so that the same baking oven may be used in applying both coatings.

Coatings of various thicknesses, depending on the service requirements of the particular conductor, may be employed. For example a 102 mil copper wire insulated with about 1.5 mils of the phenolic modified-polyvinylal resin enamel and about 2.5 mils of a pigmented vinyl chloride-vinyl acetate copolymer dispersion of the composition described in Example 3 has been produced commercially and has been found to be superior to a wire of the same diameter, insulated with a layer of about 4 mils of the modified polyvinylal resin enamel, with respect to wet dielectric strength and abrasion resistance. For example, when bent into a hairpin loop and tested in water without being annealed, the duplex-coated wire has a dielectric strength in excess of 800 volts and sometimes as high as 1200 volts. A wire of the same diameter, insulated with an equivalent (4 mils) thickness of only the modified polyvinylal resin enamel showed a very much lower dielectric strength.

As has previously been pointed out, one of the primary advantages in conductors having an inner insulating layer of phenol-aldehyde-modified polyvinylal resin enamel and an outer layer, or overcoating of a vinyl polymer or copolymer composition applied in accordance with the method of my invention is in the improved electrical properties of the conductor under extremely moist conditions.

In order to determine the relative merits of the duplex coated wires insulated as described in the foregoing description, a number of tests were made in order to compare the insulation resistance of conventional enameled wires heretofore employed, with the insulation resistance of duplex coated conductors of my invention under conditions of extreme moisture. The apparatus for making these tests included an insulation resistance meter connected in series with a recording potentiometer. The enameled wire was run at a constant speed of about 8 inches per minute through a vessel containing tap water and passed under a 3-inch pulley so arranged as to bend the strand of wire through an angle of about 90°. Any discontinuity or defect in the insulation was evidenced by a drop in insulation resistance.

The results shown in the following table indicate the superior insulation resistance of the conductors insulated by the method of my invention under conditions of extreme moisture. All of the conductors on which the following data were obtained were first coated with a layer of phenol-aldehyde-modified polyvinylal resin enamel. As overcoatings, dispersions prepared in accordance with the above Examples 6, 7 and 8 were employed.

Table

| Dispersion | Build, Mils | | Integrated Insulation Resistance | |
|---|---|---|---|---|
| | Modified Polyvinyla' Enamel | Vinyl resin dispersion over coat | Per cent of Values above 4,000 megohms | Per cent of Values above 700 megohms |
| Example 6 | 2.0 | 2.2 | 67 | 75 |
| Example 7 | 2.0 | 1.9 | 25 | 60 |
| Example 8 | 2.0 | 2.2 | 40 | 68 |

The above data clearly show the excellent insulation resistance obtainable by insulating wire in accordance with the method of my invention. As heretofore indicated, the improved insulation resistance is obtainable without sacrificing other desirable qualities characteristic of insulation consisting of only a layer of phenol-aldehyde-modified polyvinylal resin wire enamel.

What I claim as new and desire to secure by Letters Patent of the United States is:

1. The method of insulating a wire which comprises the steps of drawing the wire through a first bath of enamel comprising a phenol-aldehyde-modified polyvinylal resin, baking the resulting coating at temperatures between about 200° C. and about 500° C., drawing the wire through a second bath of enamel comprising a liquid dispersion containing (1) a resin selected from the class consisting of polymers of vinyl chloride and copolymers of vinyl chloride and vinyl acetate, (2) pigment, (3) a liquid capable of wetting and swelling said resin containing compounds selected from the class consisting of esters of phthalic and phosphoric acids, and (4) a liquid consisting of hydrocarbons having boiling points between about 100° C. and 225° C., said pigment being present in an amount of from about 30 percent to about 60 percent of said resin and the ratio of the total weight of ingredients (1) and (2) to the total weight of ingredients (2) and (3) being from about 1 to 2½ to approximately 1 to 3½; and baking said second layer at temperatures between about 200° C. and about 500° C.

2. The method of insulating a wire which comprises the steps of drawing the wire through a first bath of enamel comprising a phenol-aldehyde-modified polyvinylal resin, baking the resulting coating at temperatures between about 200° C. and about 500° C., drawing the coated wire through a second bath of enamel comprising a liquid dispersion containing 100 parts by weight of vinyl chloride-vinyl acetate copolymer, 107 parts by weight of dibutyl phthalate, 300 parts by weight of hydrocarbons having boiling points between about 100° C. and 225° C., 18 parts by weight of basic lead silicate, 42 parts by weight of titanium dioxide, and 1.5 parts by weight of gas black, and baking said second layer of enamel at temperatures between about 200° C. and about 500° C.

3. The method of insulating a wire which comprises the steps of drawing the wire through a first bath of enamel comprising a phenol-aldehyde-modified polyvinyl formal resin, baking the resulting coating at temperatures between about 200° C. and 500° C., drawing the wire through a second bath of enamel comprising a liquid dispersion containing (1) a resinous copolymer of vinyl chloride and vinyl acetate, (2) a pigment, (3) a liquid capable of wetting and swelling said resin containing compounds selected from the class consisting of esters of phthalic and phosphoric acids, and (4) a liquid consisting of hydrocarbons having boiling points between about 100° C. and 225° C., said pigment being present in an amount of from about 30 to 60 percent of said resin and the ratio of the total weight of ingredients (1) and (2) to the total weight of ingredients (2) and (3) being from about 1 to 2½ to approximately 1 to 3½, and baking said second layer at temperatures between about 200° C. and 500° C.

4. The method of insulating a wire which comprises the steps of drawing the wire through a first bath of enamel comprising a phenol-aldehyde-modified polyvinyl formal resin, baking the resulting coating at temperatures between about 200° to 500° C., drawing the wire through a second bath of enamel comprising a liquid dispersion containing (1) a resinous copolymer of vinyl chloride and vinyl acetate, (2) a pigment, (3) a liquid capable of wetting and swelling said resin containing dibutyl phthalate, and (4) a liquid consisting of hydrocarbons having boiling points between about 100° C. and 225° C., said pigment being present in an amount of from about 30 to 60 percent of said resin and the ratio of the total weight of ingredients (1) and (2) to the total weight of ingredients (2) and (3) being from about 1 to 2½ to approximately 1 to 3½, and baking said second layer at temperatures between about 200° and 500° C.

MURRAY M. SPRUNG.

REFERENCES CITED

The following references are of record in the file of this patent:

UNITED STATES PATENTS

| Number | Name | Date |
|---|---|---|
| 2,307,588 | Jackson et al. | Jan. 5, 1943 |
| 2,379,237 | Jenkins | June 26, 1945 |
| 2,403,077 | Hershberger | July 2, 1946 |

OTHER REFERENCES

Simonds and Ellis, Handbook of Plastics, 4th printing, 1943, pgs. 337–339.